United States Patent [19]

Hattori

[11] Patent Number: 5,414,625
[45] Date of Patent: May 9, 1995

[54] SYSTEM AND METHOD FOR PROVIDING STEERING CONTROL FOR AUTONOMOUS VEHICLE

[75] Inventor: Akira Hattori, Kanagawa, Japan

[73] Assignee: Nissan Motor Co., Ltd., Yokohama, Japan

[21] Appl. No.: 862,610

[22] Filed: Apr. 1, 1992

[30] Foreign Application Priority Data

Apr. 1, 1991 [JP] Japan .................................. 3-068571
Jun. 21, 1991 [JP] Japan .................................. 3-177468

[51] Int. Cl.⁶ .............................................. G06F 15/50
[52] U.S. Cl. .................................. 364/424.02; 318/587; 180/169; 348/118
[58] Field of Search ................. 364/424.01, 424.02; 318/587; 180/167–169; 348/113, 118

[56] References Cited

U.S. PATENT DOCUMENTS

| | | | |
|---|---|---|---|
| 5,081,585 | 1/1992 | Kurami et al. | 318/587 |
| 5,101,351 | 3/1992 | Hattori | 180/167 |
| 5,122,957 | 6/1992 | Hattori | 364/424.02 |
| 5,163,002 | 11/1992 | Kurami | 180/169 |
| 5,172,315 | 12/1992 | Asanuma et al. | 180/169 |
| 5,229,941 | 7/1993 | Hattori | 318/587 |
| 5,233,527 | 8/1993 | Shinnosuke | 180/169 |
| 5,301,115 | 4/1994 | Nouso | 348/118 |

*Primary Examiner*—Gary Chin
*Attorney, Agent, or Firm*—Foley & Lardner

[57] ABSTRACT

A system and method for providing a steering control for an autonomous vehicle are disclosed in which a plurality of measuring points for determining distances therefrom to respective points on an imaged white line are set, a membership function for each measuring point is set which gives a reliability $\mu l_i(j)$ to the other measuring points so that an effective range to the input values of the respective measuring points is expanded, and a control equation $sl_i$ (or $sr_i$) at each measuring point toward which the input values to the other measuring points are reflected.

29 Claims, 12 Drawing Sheets

FIG.13

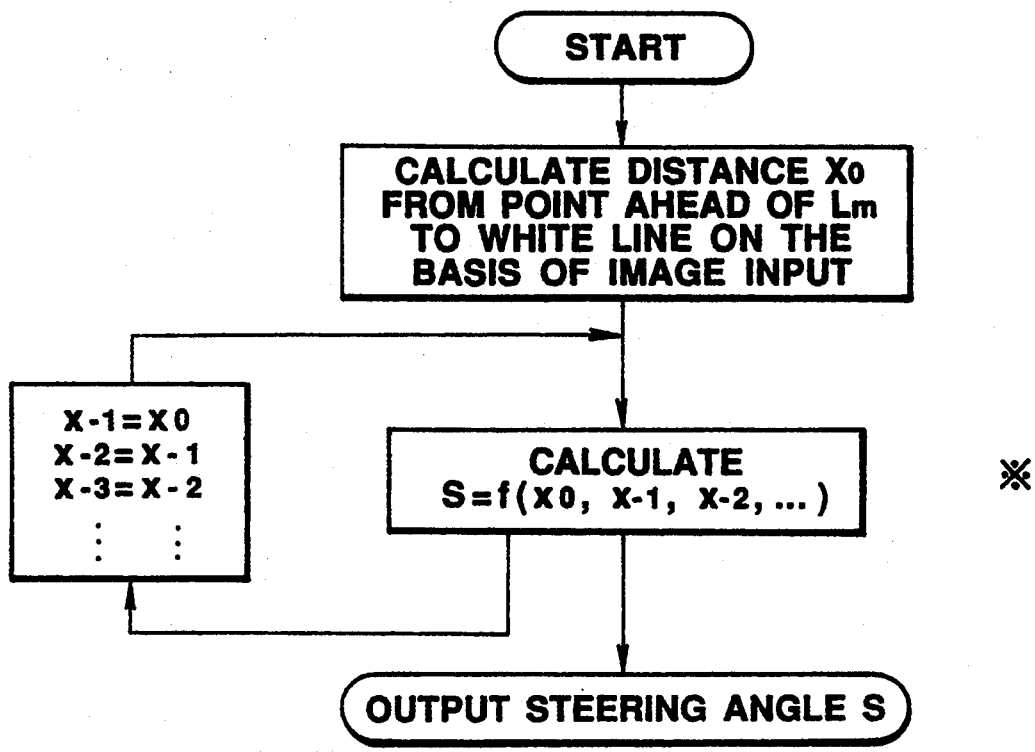

※ CALCULATION METHOD OF
$S = f(x_0, x_{-1}, x_{-2}, \ldots)$
DATA $S(i)$, $x_0(i), x_{-1}(i), \ldots (i = 0 \sim n)$ $$S(0) = \alpha \cdot x_0(0) + \beta \cdot x_{-1}(0) + \gamma \cdot x_{-2}(0) + \ldots\ldots + \delta$$
$$S(1) = \alpha \cdot x_0(1) + \beta \cdot x_{-1}(1) + \gamma \cdot x_{-2}(1) + \ldots\ldots + \delta$$
$$\vdots$$
$$S(n) = \alpha \cdot x_0(n) + \beta \cdot x_{-1}(n) + \gamma \cdot x_{-2}(n) + \ldots\ldots + \delta$$

↓

ESTIMATE COEF. $(\alpha, \beta, \gamma, \ldots\ldots \delta)$ BY MEANS OF MULTIPLE REGRESSION ANALYSIS

↓

$$S = \alpha \cdot x_0 + \beta \cdot x_{-1} + \gamma \cdot x_{-2} + \ldots\ldots + \delta$$

FIG.14
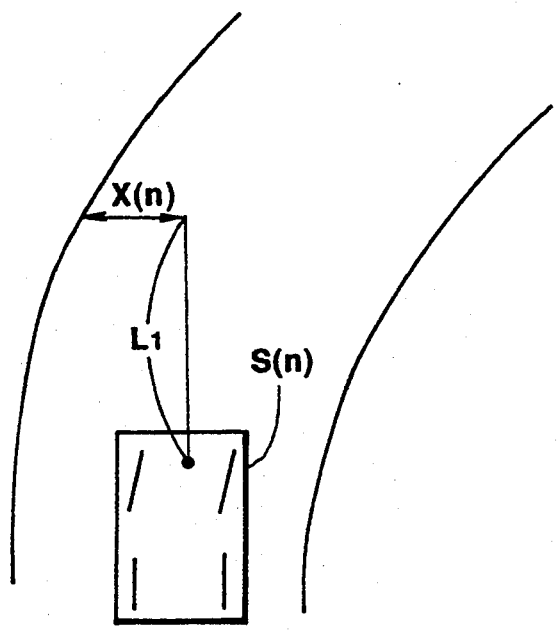
FIG.14
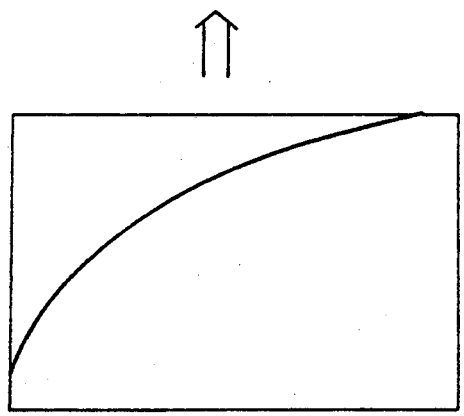
FIG.14(B)
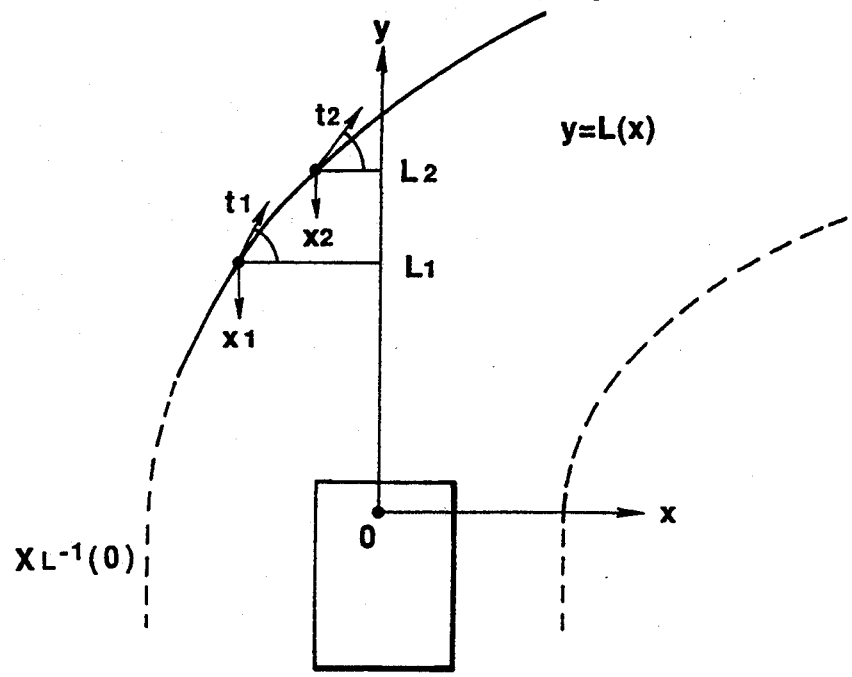
FIG.14(A)

FIG.15

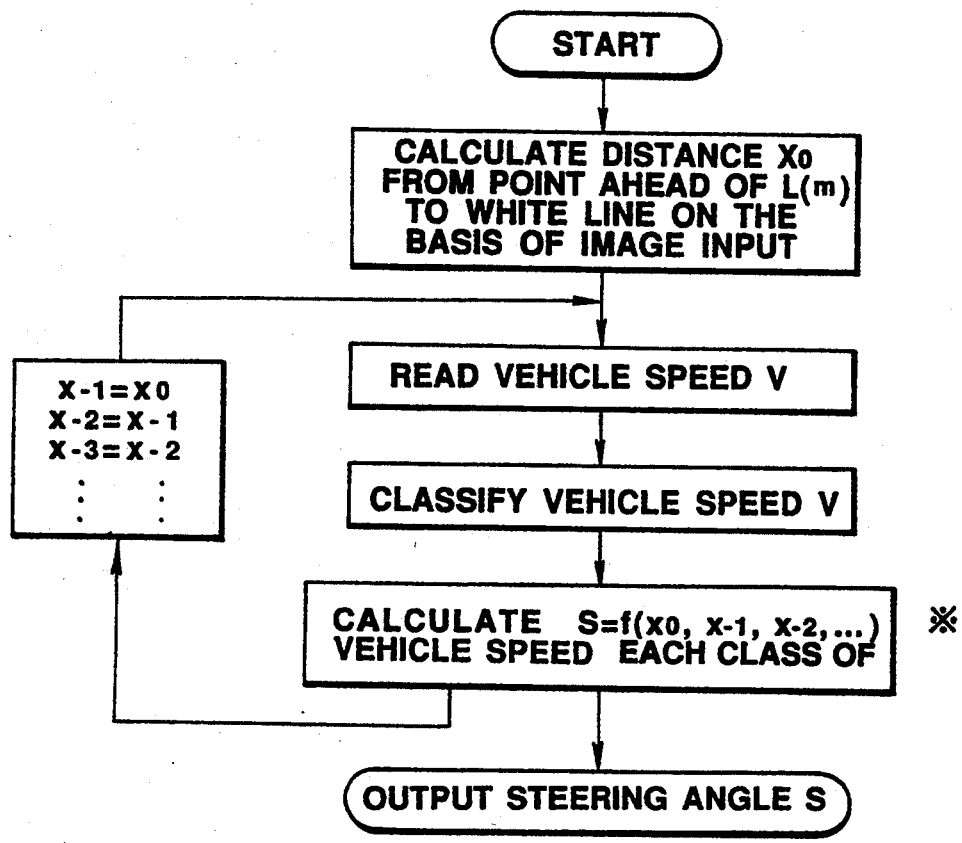

※ CALCULATION METHOD OF
$S = f(x_0, x_{-1}, x_{-2}, ...)$
DATA $S(i), x_0(i), x_{-1}(i), ... (i = 0 \sim n)$ $$S(0) = \alpha \cdot x_0(0) + \beta \cdot x_{-1}(0) + \gamma \cdot x_{-2}(0) + ...... + \delta$$
$$S(1) = \alpha \cdot x_0(1) + \beta \cdot x_{-1}(1) + \gamma \cdot x_{-2}(1) + ...... + \delta$$
$$\vdots$$
$$S(n) = \alpha \cdot x_0(n) + \beta \cdot x_{-1}(n) + \gamma \cdot x_{-2}(n) + ...... + \delta$$

ESTIMATE COEF. $(\alpha, \beta, \gamma, ...... \delta)$ BY MEANS OF MULTIPLE REGRESSION ANALYSIS $$S = \alpha \cdot x_0 + \beta \cdot x_{-1} + \gamma \cdot x_{-2} + ...... + \delta$$

SYSTEM AND METHOD FOR PROVIDING STEERING CONTROL FOR AUTONOMOUS VEHICLE

BACKGROUND OF THE INVENTION

1. Field of the Invention

The present invention relates generally to a system and method for providing a steering control for an autonomous vehicle. The autonomous vehicle of the present invention runs autonomously on the basis of a road contour index detected by a photograph device, such as a video camera.

2. Description of the Background Art

U.S. patent application Ser. No. 07/485,910, now U.S. Pat. No. 5,122,957, which has been filed on Feb. 27, 1990 and recently allowed exemplifies a first previously proposed autonomous vehicle.

In addition, U.S. patent application Ser. No. 07/337,707, filed on Apr. 13, 1989, now U.S. Pat. No. 5,229,941, exemplifies a second previously proposed autonomous vehicle.

Furthermore, Japanese Patent Application First Publication No. Heisei 2-270005 published on Nov. 5, 1990 (which corresponds to U.S. patent application Ser. No. 07/507,572, now U.S. Pat. No. 5,101,351, which has been filed on Apr. 11, 1990 and has recently been allowed) exemplifies a third previously proposed autonomous vehicle in which a camera is mounted on the vehicle for photographing a white line extended along the running road or a side edge of the running road and a steering wheel of the vehicle is controlled so as to run the vehicle substantially in parallel to the photographed white line.

In the third previously proposed autonomous vehicle, the autonomous vehicle runs automatically with the accurate steering control achieved over a complex curved road on the basis of positions of the white line at a multiple number of measuring points of location placed ahead of the vehicle.

In addition, in the third previously proposed autonomous vehicle, the autonomous vehicle can accurately run on a center position of the road which is in the form of the letter S, as compared with the case in which the run of the vehicle is based on a single measuring point of information including a white line position at a constant distance from a forward local range of the vehicle.

However, it becomes difficult to maintain the accuracy of the control over the steering movement according to the photographed image of the road shape index such as the white line, e.g., when a shadow of a building located near the ground of road rests thereon and recognition of the white line becomes impossible, or when the position of white line at the measuring point of location is out of range of the photographing camera.

In order to compensate for such deficiencies as described above, the number of measuring points may be set by a multiple number of points of locations so that a bad effect of lacking a single or two points of measuring points at which the information of the white line can be obtained can be minimized. However, since it is uncertain where an interruption of the series of road shape index occurs, the settings of the measuring points needs to be close to each other. However, the information at the additively increased measuring points are usually not necessary and not used. In addition, a large capacity of memory for storing the measurement information is simultaneously required in a steering control device of the autonomous vehicle and the processing speed of the control device are reduced.

SUMMARY OF THE INVENTION

It is, therefore, an object of the present invention to provide a system and method for providing a steering control for an autonomous vehicle in which even if a local interruption of a road contour index such as a white line occurs, highly accurate control information for each measuring point is generated with no excessive number of measuring points in the autonomous vehicle and a highly reliable steering control result of output can be achieved.

The above-described object can be achieved by providing a steering control system for an autonomous vehicle, comprising: a) first means, disposed on the vehicle so as to face toward a vehicular forward direction, for monitoring the presence of a road contour index extended in the vehicular forward direction; b) second means for setting a plurality of measuring points for a plurality of predetermined distances set toward the vehicular forward direction ahead of a vehicular center on a vehicular coordinate system; c) third means for defining positions of the monitored road contour index with respect to the respective measuring points and outputting the position data of the monitored contour index defined with respect to the respective measuring points; d) fourth means for setting a membership function for each measuring point which at least gives predetermined reliabilities to input values of the position data for the measuring points mutually adjacent to the corresponding one of the measuring points to which the membership function is set; and e) fifth means for calculating a steering angle through which a steering mechanism of the vehicle is steered for each measuring point with the position data for the respective measuring points as input parameters, said fifth means calculating the steering angle for each measuring point, the input parameters of the other measuring points being included in the calculation of the steering angle for any one of the measuring points according to their reliabilities given to the other measuring points.

The above-described object can also be achieved by providing a system for providing a steering control for an autonomous vehicle so as to run the vehicle in parallel to a road contour index, comprising: a) first means having a video camera, the video camera being disposed on the vehicle so as to face a vehicular forward direction, for photographing a white line as the road contour index extended along a side edge of a running road and outputting an image signal indicating a presence of the white line: b) second means including an image processing block for setting a plurality of measuring points for a plurality of predetermined distances set toward the vehicular forward direction ahead of a vehicular center on a vehicular coordinate system and for defining positions of the white line respect to the respective measuring points and outputting the position data of the white line at the respective measuring points and outputting the defined position data; c) third means for setting a running reference line on which the vehicle is to run autonomously; d) fourth means for setting a membership function for each measuring point which at least gives predetermined reliabilities to input values of the position data for the measuring points mutually adjacent to the corresponding one of the measuring points to which the membership function is set; and e) fifth means for calculating a steering angle through which a steering mechanism of the vehicle is steered for each measuring point with the position data for the respective measuring points and output from the third means as input values, said fifth means calculating the steering angle for each measuring point on a basis of a weighted mean method in which their reliabilities are multiplied by the position data for the respective measuring points and outputting a final steering angle which is calculated using a gross mean of the calculated steering angle.

The above-described object can also be achieved by providing a method for providing a steering control for an autonomous vehicle so as to run the vehicle in parallel to a road contour index, comprising the steps of: a) monitoring a presence of the road contour index extended in the vehicular forward direction; b) setting a plurality of measuring points for a plurality of predetermined distances set toward the vehicular forward direction ahead of a vehicular center on a vehicular coordinate system; c) defining positions of the monitored road contour index with respect to the respective measuring points and outputting the position data of the monitored contour index defined with respect to the respective measuring points; d) setting a membership function for each measuring point which at least gives predetermined reliabilities to input values of the position data for the measuring points mutually adjacent to the corresponding one of the measuring points to which the membership function is set; and e) calculating a steering angle through which a steering mechanism of the vehicle is steered for each measuring point with the position data for the respective measuring points as input values, said step e) calculating the steering angle for each measuring point, the input parameters of the other measuring points being included in the calculation of the steering angle for any one of the measuring points according to the reliabilities given to the other measuring points.

BRIEF DESCRIPTION OF THE DRAWINGS

FIG. 10 (B) is a characteristic graph representing a relationship between a steering ankle S (deg.) and elapsed time t (time) in the case shown in FIG. 10 (A).

FIG. 13 is an operational flowchart indicating an arithmetic operation processing in the second preferred embodiment in the case shown in FIG. 12.

FIGS. 14, 14 (A) and 14 (B) are explanatory top views for integrally explaining the operation in the case of a third preferred embodiment.

FIG. 15 is an operational flowchart for explaining an operation of the control unit in the third preferred embodiment according to the present invention.

DETAILED DESCRIPTION OF THE PREFERRED EMBODIMENTS

Reference will, hereinafter, be made to the drawings in order to facilitate a better understanding of the present invention.

First Preferred Embodiment

Figure 1:
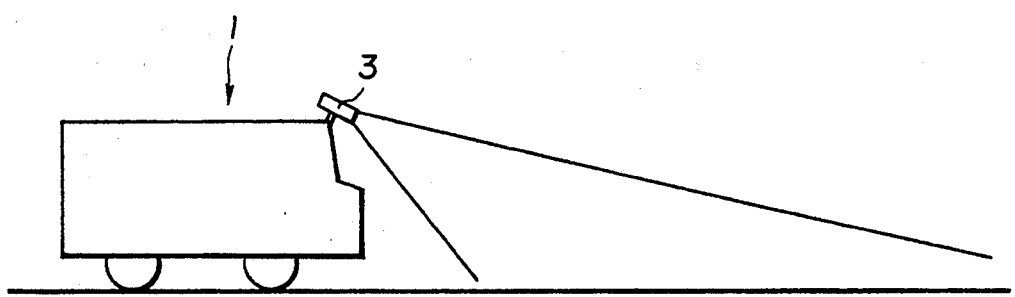
FIG. 1 is a perspective view of a camera-mounted autonomous vehicle to which the present invention is applicable.

FIG. 1 shows an external view of an autonomous vehicle to which the present invention is applicable.

The autonomous vehicle 1 is provided with a camera 3 mounted on a front top end of the autonomous vehicle 1 for photographing a white line located on a road on which the vehicle 1 is to run, as shown in FIG. 1.

Figure 2:
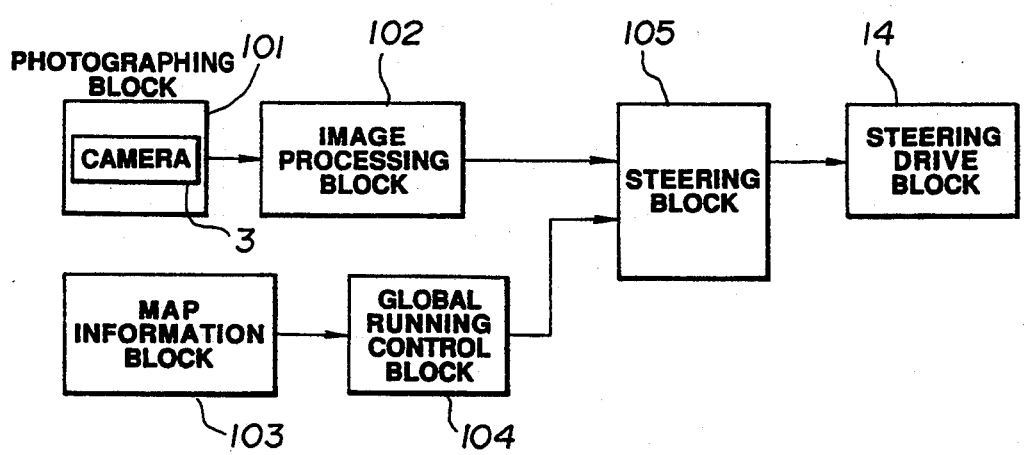
FIG. 2 is a simplified circuit block diagram of a system for providing a steering control for the autonomous vehicle in a first preferred embodiment according to the present invention.

FIG. 2 shows a circuit block diagram of a system for providing a steering control for the autonomous vehicle 1 shown in FIG. 1.

As shown in FIG. 2, the steering control system includes a photographing block 101 including the camera 3, an image processing block 102 which detects the white line position at a one or a plurality of measuring points previously set with a photographing signal derived from the camera 3 image processed in a digital image processing mode, a global running control block 104 connected to a map information storing block 103, a steering control block 105, and a steering drive block 14.

It is noted that the general structure of the system shown in FIG. 2 is exemplified by the U.S. patent application Ser. No. 07/337,707 described in the BACKGROUND OF THE INVENTION which is now pended, the disclosure of which is herein incorporated by reference.

The map information storing block 103 stores the map information such as a road map on a route of travel by the autonomous vehicle such as a node or pass information.

The global running control block 104 refers to the map information fetched from the map information storing block 103 and determines route information to the effect that, for example, a running reference line 21 (FIG. 3) on the determined running road 20 of the vehicle has a distance X from a white line extended along a left side of the road. The distance X may be varied, for example, so that the vehicle 1 can always run on a center of the running road even if the road width is changed.

The steering controlling block 105 determines a steering angle of a vehicle steering mechanism of the autonomous vehicle on the basis of a white line position information derived from an image processing block 102 and a route information derived from the global running controlling block 104. The steering drive block 14 actuates an actuator of the steering mechanism on the basis of the steering angle, as appreciated from FIG. 3.

Figure 4:
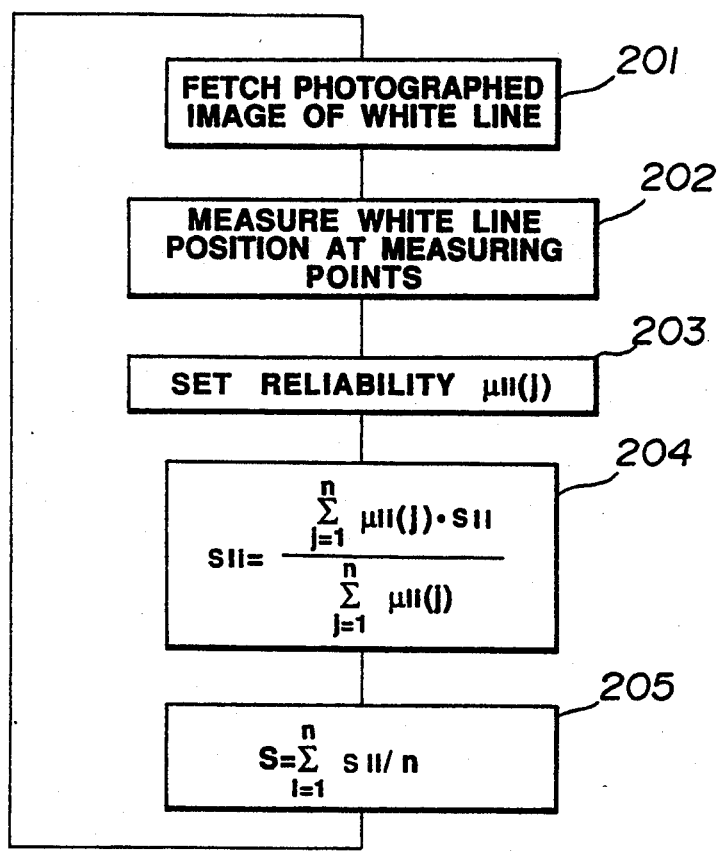
FIG. 4 is an operational flowchart executed by the steering control system in the first preferred embodiment according to the present invention shown in FIG. 2.

FIG. 4 shows a general control flowchart executed in the first preferred embodiment.

The flowchart shown in FIG. 4 is continuously executed during the running of the vehicle 1 on a road to be traveled.

In FIG. 4, at a step 201, the photographing block 101 photographs a running road scene placed in the forward direction of the autonomous vehicle 1, fetches the white line image component, and transmits the photographed image signal to the image processing block 102. At a step 202, the image processing block 102 sets particular viewed positions in front of the autonomous vehicle 1 in FIG. 3 (a plurality of positions in a range of the forward direction of the vehicle 1 from 5 meters to 25 meters) as measuring points li ($i=1, 2, 3, —, n$). Relative positions xi ($i=1, 2, 3, —, n$) of the white line 22 to a coordinate system of the vehicle 1 prepared for the vehicular position with respect to the running road are measured, and are output from the image processing block 102 as the white line information. The white line serves as a road contour index.

Figure 5:
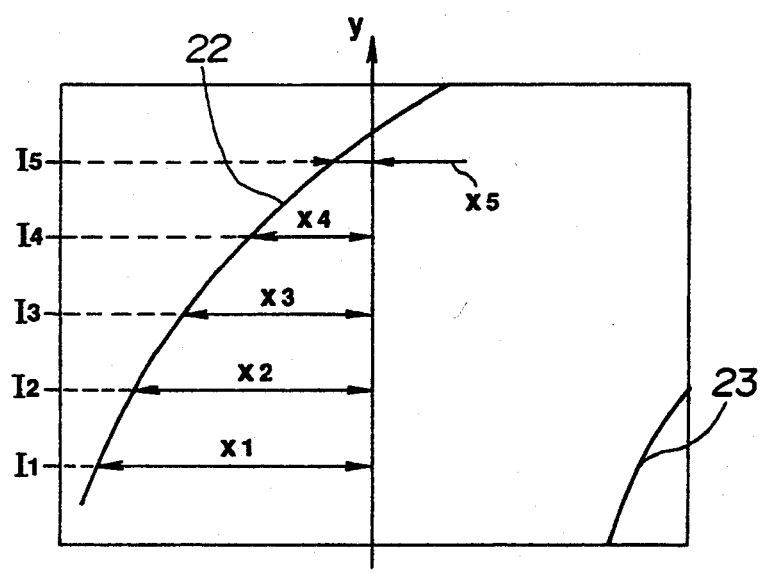
FIG. 5 is an explanatory view of an image data photographed by the camera shown in FIG. 1 and indicating the measuring points and white line position information used in the first preferred embodiment shown in FIG. 2.

FIG. 5 shows white line position information of the road in front of the vehicle 1 derived as the result of image processing by the image processing block 102 in the step 202.

Next, the steering control block 105 calculates the steering angle of the vehicle 1 as a controlled variable from the white line information derived from the image processing block 102 and route of travel information derived from the global running control block 104.

That is to say, since a control equation $sl_i = Fl_i(xi)$ corresponding to each measuring point $l_i$ is set in the steering control block 102, the term of $Fl_i(x_i)$ is expressed in the following equation using a running road reference line $X_i$ ($i=1, 2, 3, —, n$), e.g., a distance in the image from a point of the white line to a point of a virtual line extended longitudinally through a vehicular center point and corresponding to each measuring point $l_i$.

$$Fl_i(x_i) = \alpha_i \cdot (X_i - x_i) \qquad (1)$$

Figure 3:
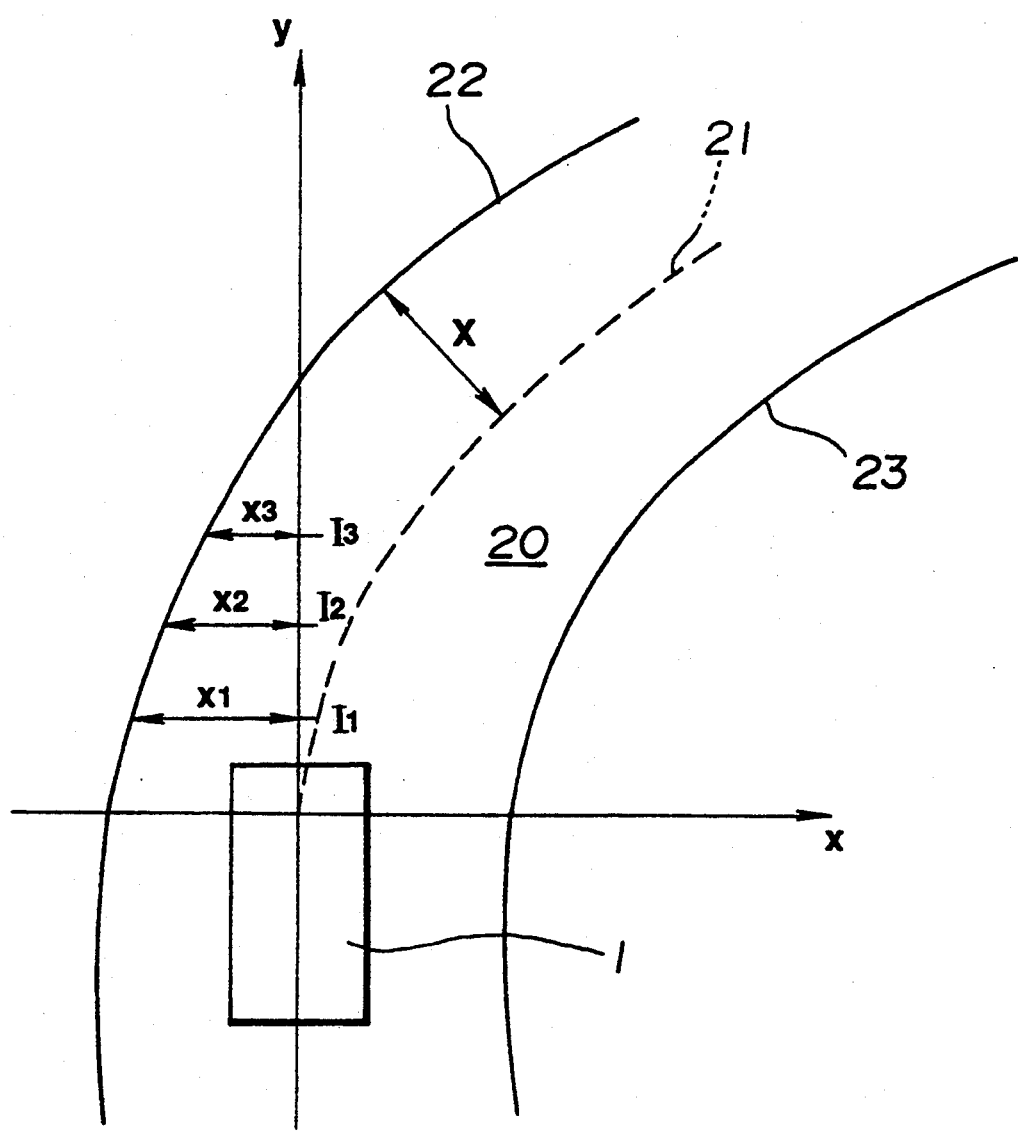
FIG. 3 is an explanatory view for explaining a positional relationship off a road on which the autonomous vehicle runs and the autonomous vehicle in the first preferred embodiment shown in FIG. 2 especially indicating a plurality of measuring points, x-y coordinate system for the vehicular position, and a road running reference line.

The left term of $Fl_i(x_i)$ denotes a function of a displacement deviation quantity from the running reference line 21 of the vehicle, as appreciated from FIG. 3.

Referring to FIG. 4, at a step 203, a reliability $\mu l_i(j)$ ($j=1, 2, 3, —, n$) to an input value of each measuring point including the instantaneous measuring point during the execution of the flowchart of FIG. 4 is set for each measuring point. A lateral margin to the reliability $\mu l_i(j)$ ($j=1, 2, 3, —, n$) is thereby provided.

Figure 6A:
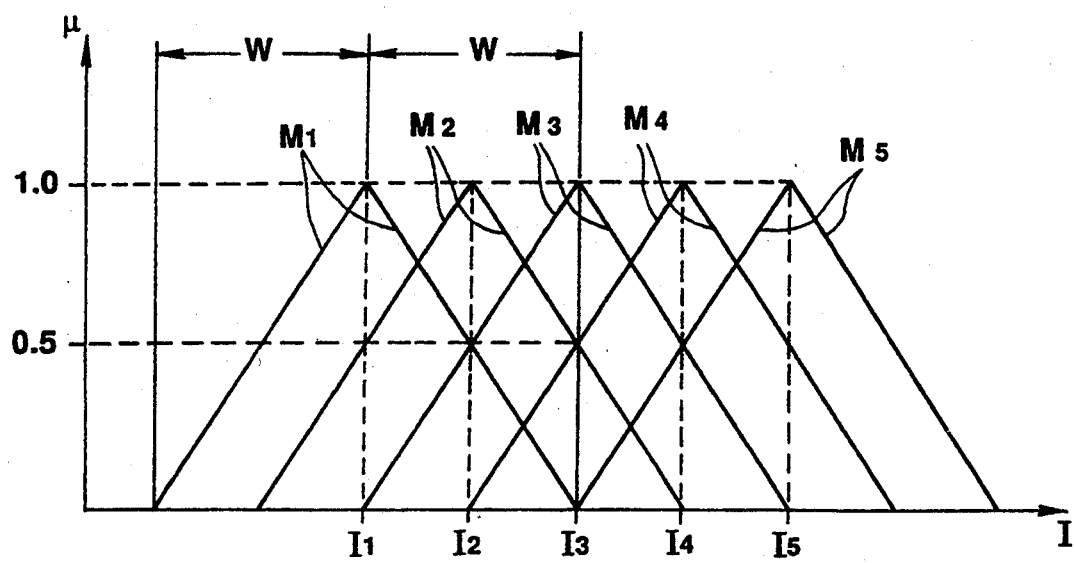
FIGS. 6 (A) and 6 (B) are comparable characteristic graphs of membership functions with respect to reliabilities in the cases of the membership functions in the first preferred embodiment and of conventionally used membership functions, respectively.
Figure 6B:
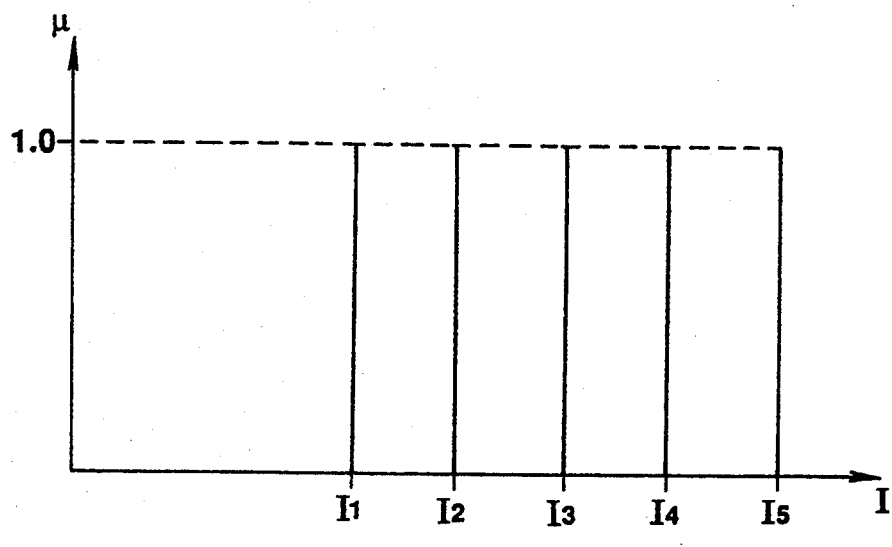

If the reliability is represented by a membership function Mi ($i=1, 2, 3, —$), the control equation of $sl_i = Fl_i(x_i)$ is conventionally established only to an input value at each of the measuring points $l_i$ in the form of the reliability $\mu = 1.0$, as shown in FIG. 6 (B) and, on the other hand, the reliability indicates zero to the other input values except those of the measuring points.

Referring to FIG. 6 (A), each width W of the membership functions Mi, in the case of the first preferred embodiment, provides intermediate reliabilities to the input values of The measuring points positionally adjacent to the measuring points $l_i$.

According to the example of FIG. 6 (A), the membership function Mi providing the reliability of 1.0 to the input value at the measuring point $l_1$ provides, in turn, the reliability of 0.5 to the input value of the measuring point $l_2$.

Referring to FIG. 4, at a step 204, the control equation $sl_i$ for each measuring point is calculated by the following equation using a weight mean method on the basis of a fuzzy inference.

$$sl_i = \left( \sum_{j=1}^{n} \mu l_i(j) \times sl_i \right) / \sum_{j=1}^{n} \mu l_i(j) \qquad (2)$$

If specific numerical values are exemplified with reference to FIG. 6 (A), the membership function M2 on the control equation $sl_2 = Fl_2(x)$ with respect to the measuring point $l_2$ is such that the reliability is 0.5 to the input value of the measuring point $l_1$, the reliability is 1.0 to the input value of the measuring point $l_2$, the reliability is 0.5 to the reliability for the input value of the measuring point $l_3$. Therefore, the following equation is established.

$$Sl_2 = (0.5 \times Fl_2(x_1) + 1.0 \times Fl_2(x_2) + 0.5 \times Fl_2(x_3))/(0.5 + 1.0 + 0.5) \qquad (3)$$

When any one or more of the measuring points is not derived at the time of processing shown in FIG. 4, its term in the corresponding control equation is eliminated. If an abnormal value is derived, its corresponding term is eliminated with the reliability being zero. In the same way, $sl_1$, $sl_3$, —, are calculated.

The terms $Sl_1$, $Sl_2$, $Sl_3$ corresponding to the respective measuring points thus derived are subjected to a gross mean calculation at a step 205.

A final steering angle S is, consequently, derived by the following equation:

$$S = \sum_{i=1}^{n} sl_i / n \qquad (4)$$

The steering drive block 14 of FIG. 2 actuates the actuator of the vehicular steering mechanism in response to the signal indicating the final steering angle S from the steering control block 105 in FIG. 2.

Figure 7:
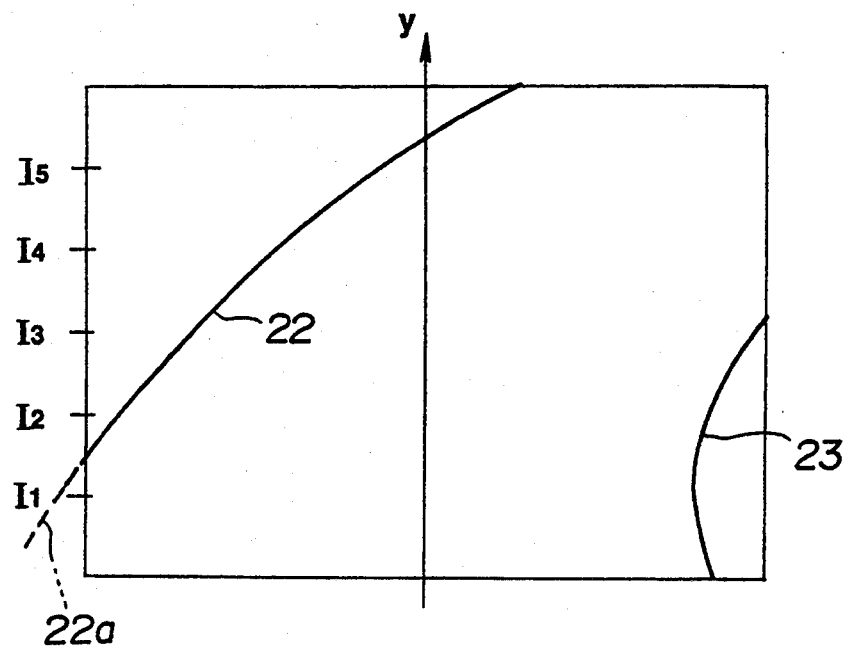
FIG. 7 is an explanatory view of an image data photographed by the camera shown in FIG. 1 in a case when a part of the white line placed at a left side edge of the running road leaves the field of view of the camera shown in FIG. 1.

As described above, when, in the autonomous vehicle steering control system of the first preferred embodiment, a part off the white line 22a (refer to FIG. 7) at the measuring point l₁ becomes out of the field of view from the camera 3, for example, as viewed from FIG. 7, the membership function M1 off the reliability 1.0 is given to the input value of the measuring point l₁ and that M1 of the reliability 0.5 is given to the input value of the measuring point l₂. Therefore, the information at the other measuring points is effectively compensated for. Consequently, a highly accurate steering angle according to the road situation can be obtained.

In addition, the same is applied to the case where the white line photographed by the camera 3 is interrupted due to a presence of obstacle such as a standing tree or due to a presence of a shadow reflected by a building on a part of the white line.

Figure 8:
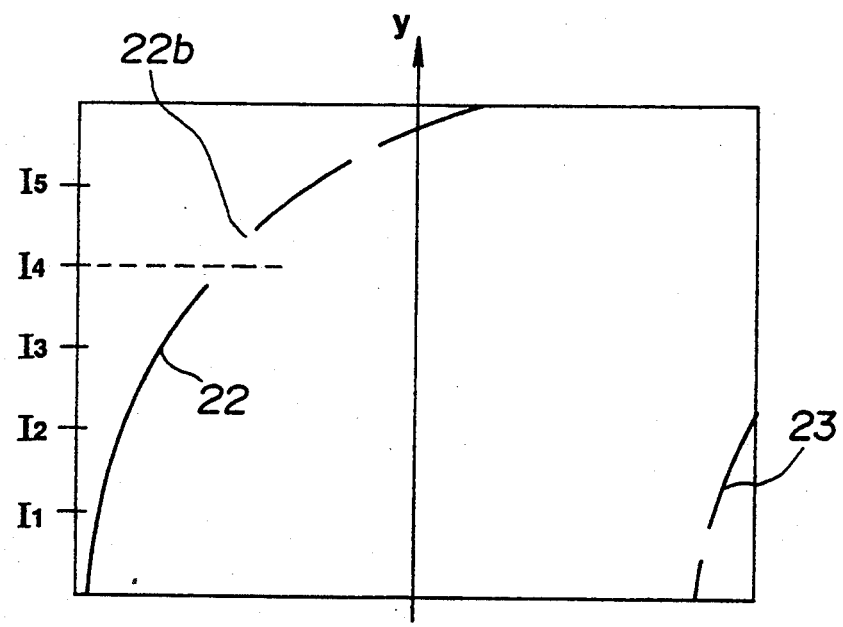
FIG. 8 is an explanatory top view of another image data photographed by the camera shown in FIG. 1 in a case where an interruption of the white line image occurs.

FIG. 8 shows an image photographed by the camera 3 in a case where the image of white line 22b at the measuring point l₄ is not recognized and not received due to the presence of an obstacle.

Although the input value at the measuring point l₄ is not generated in the case shown in FIG. 8, the control equation sl₄=Fl₄ (x) for the measuring point l₄ is derived from the input values of the adjacent measuring points l₃ and l₅. That is to say, the x value of the measuring point l₃ and the x value of the measuring point l₅ are substituted into the control equation Fl₄ and the calculations of sl₄₃=Fl₄ (x₃) and sl₄₅=Fl₄ (x₅) are carried out. These values, the reliability 0.5 to the measuring point l₃, and the reliability 0.5 for the measuring point l₅ are used to derive the following equation:

$$sl_4 = (0.5 \times sl_{43} + 0.5 \times sl_{45})/(0.5+0.5) \quad (5)$$

In the first preferred embodiment, since the measuring points for the white line 22 are set in plural, an effective range of the input values of the respective measuring points is expanded by means of the corresponding membership functions, and the control equations at the respective measuring points to which the weighted input values at the other measuring points are added are calculated the final steering angle S can accurately be determined using the white line data for the other measuring points even if the white line position for a certain measuring point becomes out of the field of view from the camera 3 or the white line is interrupted due to the presence of the shadow reflected by a building.

It is noted that although, in the first preferred embodiment, the control equation sl$_i$ (sl$_i$ indicates the follow-up control of the steering operation in parallel to the white line placed at the left side edge of the road,) the other control equation sr$_i$ may be set as the follow-up control thereof in parallel to the other white line placed at the right side edge of the road, or the still other control equation s$_i$ (=(sl$_i$+sr$_i$)/2) may be set as the is follow-up control thereof in parallel to both left and right white lines) at each of the measuring points l$_i$ is the function of displacement deviation quantity (X$_i$−x$_i$) of the vehicle from the running reference line 21, the control equation sl$_i$ may alternatively be a function of a time series change in the white line position as follows:

$$sl_i = \alpha_i \cdot x_i(N) + \beta_i \cdot x_i(N-1) + \pi_i \cdot x_i(N-2) + \delta_i$$

(, wherein N denotes a present value, N−1 and N−2 denotes one and two previous values). (6)

Second Preferred Embodiment

Next, an example of the steering angle calculation using the above-described equation (6) will be described below.

Figure 9:
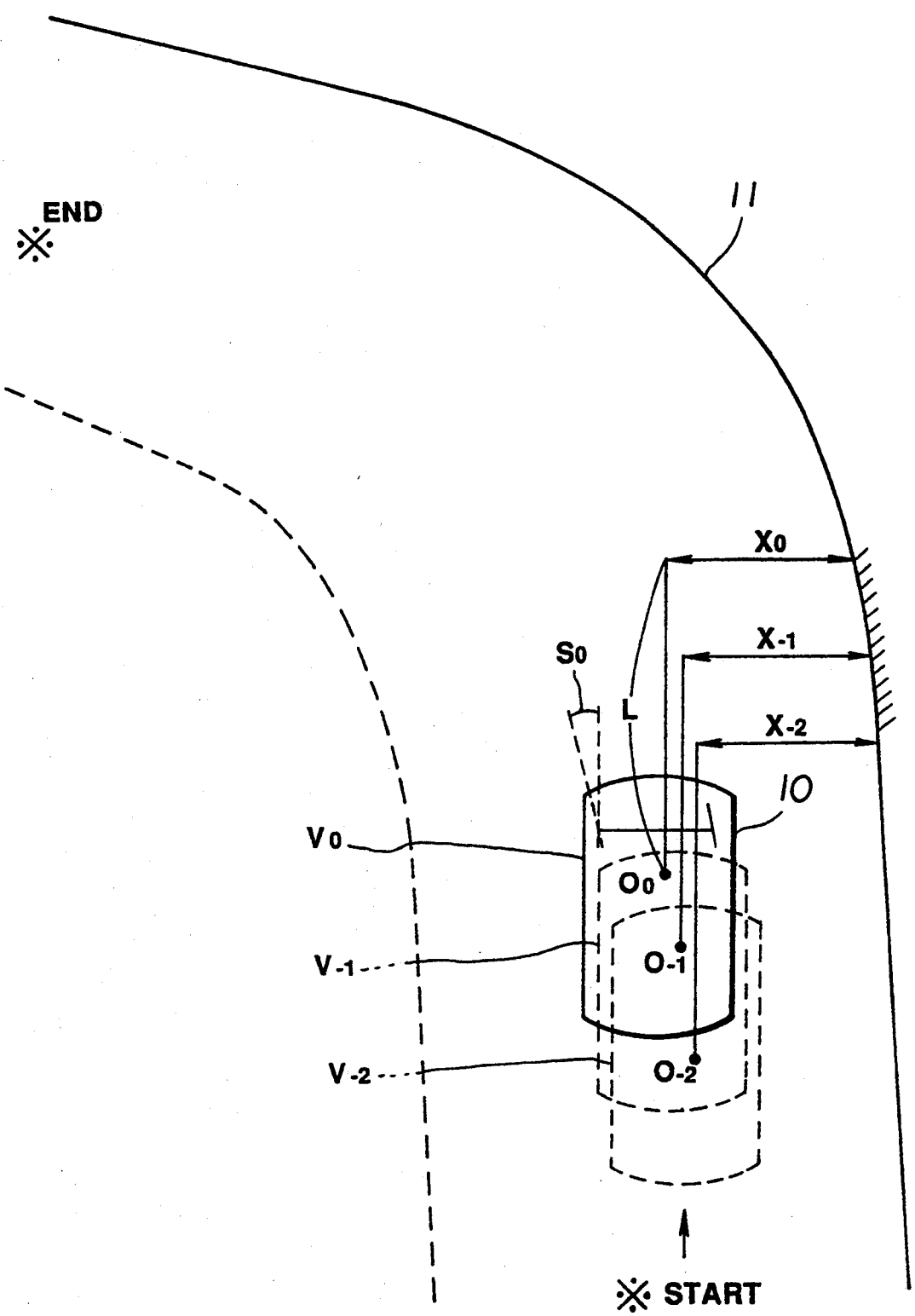
FIG. 9 is an explanatory top view of a relationship between a road segment on which the autonomous vehicle in a second preferred embodiment is to run for explaining an estimation of a predictive steering angle by a multiple regression function.

FIG. 9 is an explanatory top view for explaining the operation in the second preferred embodiment.

Now suppose that the steering control is based on a follow-up control in parallel to the white line 23 placed at the right side edge of the road and the control equation sr$_i$ for each measuring point l$_i$ is taken into consideration (in the case of the left side white line 22, sl$_j$)

In addition, suppose that the autonomous vehicle 1 runs from a straight road to another straight road via a curved road as in the case shown in FIG. 9.

Furthermore, suppose that, as shown in FIG. 9, X₀ denotes a distance from a point straight L (m) ahead of a vehicle center O₀ virtually set as a center of the vehicle steering mechanism of the vehicle placed at a position denoted by v₀ to a point of the right side white line denoted by 11 in the case shown in FIG. 9 which is placed in a vertical direction to the vehicular forward direction virtually denoted by L, and S₀ denotes a steering angle in the case shown in FIG. 9.

Figure 10A:
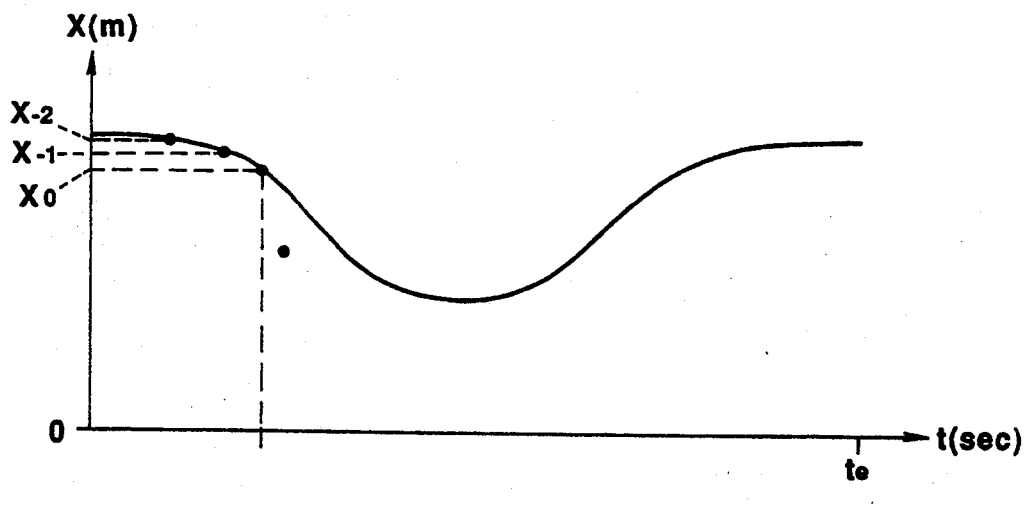
FIG. 10 (A) is a characteristic graph representing a relationship between a change in a white line distance information X and elapsed time t when a steering operator actually operates a steering wheel of a steering mechanism and the vehicle runs on the road segment shown in FIG. 9.
Figure 10B:
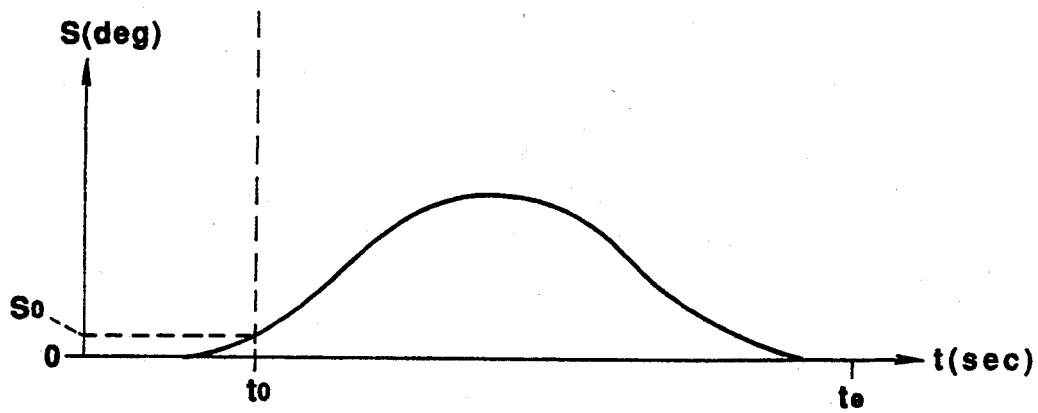

In the case of vehicular run shown in FIG. 9, FIG. 10 (B) shows a steering behavior, i.e., a relationship between the steering angle S (deg.) and elapsed time t (sec.) if a human kind, i.e., an operator (driver) operated a steering wheel of the autonomous vehicle to run the vehicle from, e.g., ※ START position to an END ※ position of FIG. 9.

In addition, FIG. 10 (A) shows a relationship between a change in the white line position information x at a position L (meters) ahead of the vehicle center O₀ and elapsed time t.

As appreciated from FIGS. 10 (A) and 10 (B), the similar change of the steering angle having a delay (FIG. 10 (B)) to the change of the white line distance information (FIG. 10 (A)) appears at the curved road position.

In FIG. 10 (B), if a predictive steering angle S₀ after a time of t₀ is estimated according to the change in the white line information at the present time shown in FIG. 10 (A), an appropriate value of the predictive steering angle can be achieved.

As the information (variable) on the change in the white line distance to the white line 11 includes a change value of value x per control period (first order differential value) and a change value of the change value per control period (second order differential value) were used. Although in a multiple regression function an indefinite number of data on the change rates can be defined, a result of its experiment indicated that the present value, one previous value, and two previous value were sufficiently satisfied in the multiple regression function.

Hence, as the input value, the present white line distance information x₀, the previous value before one control period x₋₁, and that before two control periods x₋₂ were used.

A regression function equation f indicating the predictive steering angle S₀ after the time t₀ second can be expressed as follows:

$$S_0 = f(x_0, x_{-1}, x_{-2}) \\ = \alpha \cdot x_0 + \beta \cdot x_{-1} + \gamma \cdot x_{-2} + \delta \quad (7)$$

The multiple regression analysis is used to estimate the values of $\alpha$, $\beta$, $\gamma$, and $\delta$, using the equation (7), all data of S ($S_{-2}$, $S_{-1}$, $S_0$) and x from the start position ※ START to the end position ※ END.

Figure 11:
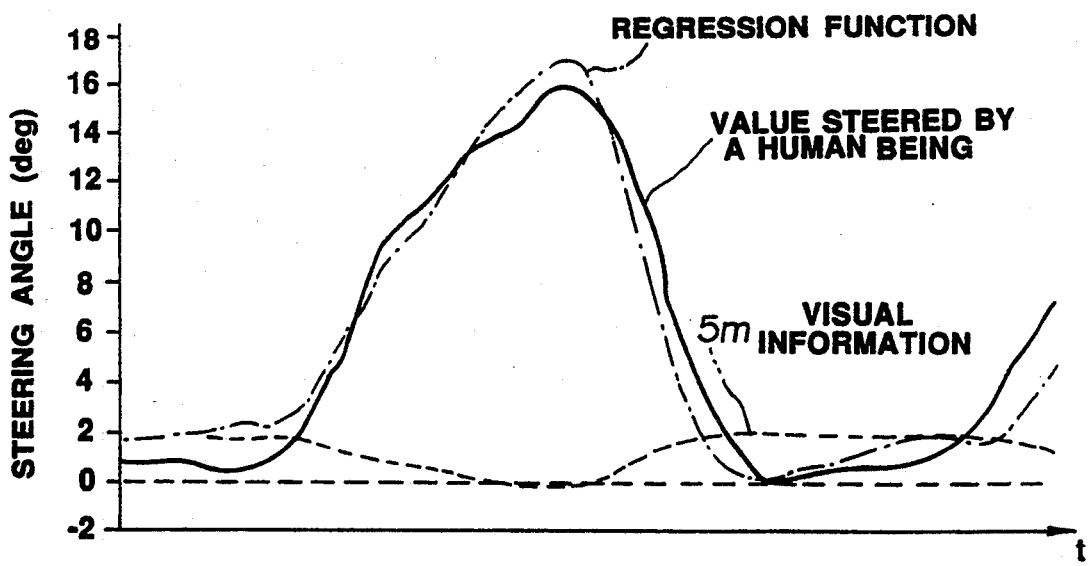
FIG. 11 is a characteristic graph representing a relationship of actually measured values between the steering angle S and elapsed time t.

FIG. 11 shows actual values of the relationship of the steering angle S to the elapsed time t.

FIG. 11 shows an example of a result of the estimation of the predictive steering angle (S) by the regression function equation (7) on the basis of the data on the actual steering angle (in degrees) and the white line information 5 meters ahead of the vehicle center $O_0$ derived by the photographing device when the steering operator operates the steering wheel of the vehicle to run the vehicle on the road including the curved road segment ($\gamma = 15$ m) shown in FIG. 9 at a vehicle speed of 10 Km/h.

In FIG. 11, a solid curved line denotes the value when the steering operator actually operates the steering wheel of the vehicle. To run the vehicle, a broken curved line denotes a visual information of 5 meters ahead of the vehicle center $O_0$, and a dot-and-dash curved line denotes the steering history estimated by the regression function.

In this case, $$S = -0.84581 \cdot x_0 - 7.13965 \cdot x_{-1} + 0.21617 \cdot x_{-2} + 15.4842$$

As shown by the dot-and-dash line in FIG. 11, it indicates that the value of the actual run denoted by the solid line is substantially coincident with that of the dot-and-dash line.

Figure 12:
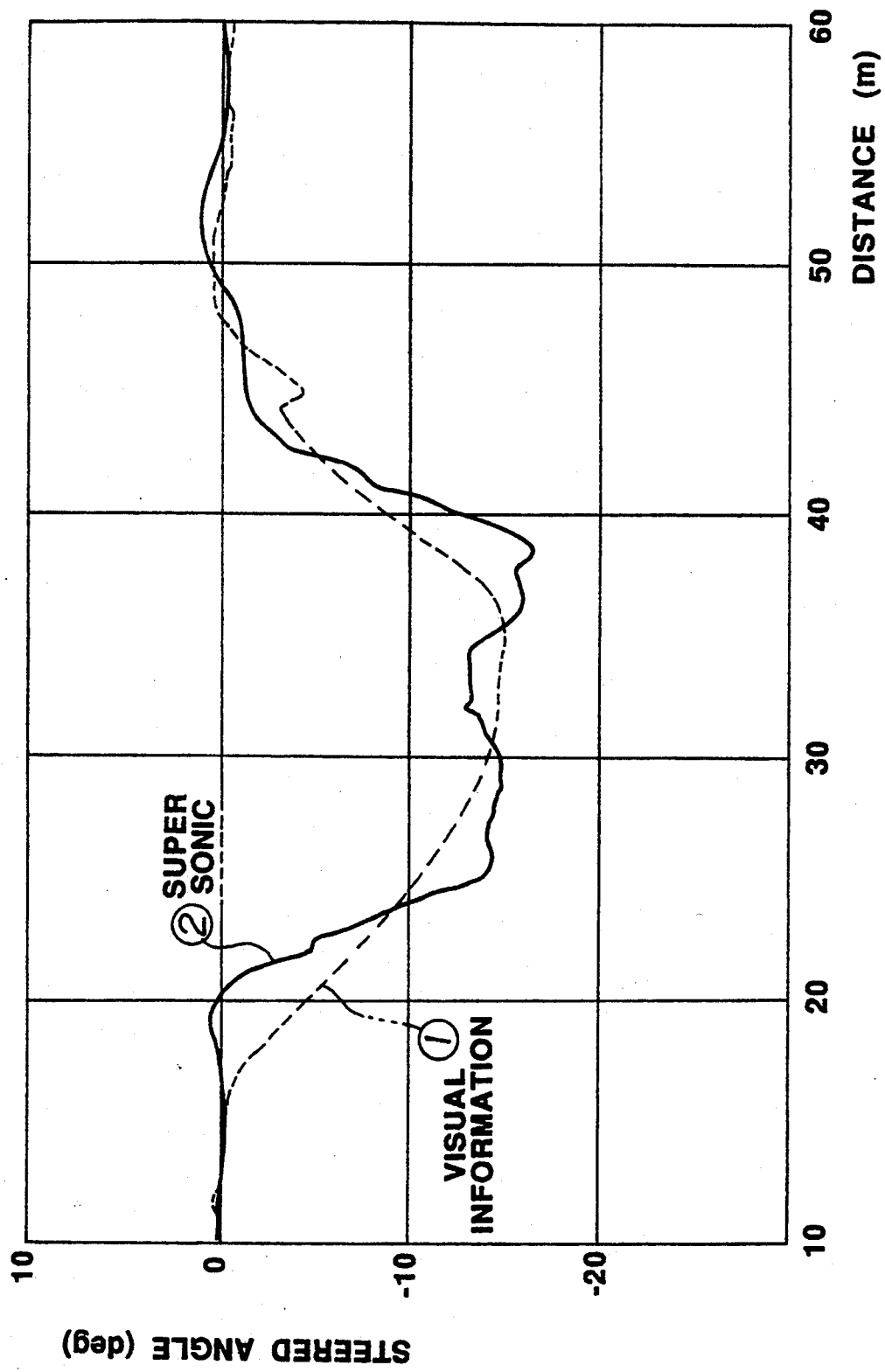
FIG. 12 is a characteristic graph in a case where the steering control on the basis of an estimation by the multiple regression analysis is actually carried out.

FIG. 12 shows the actual steering control characteristics of the autonomous vehicle in the case of the vehicular run according to the steering angle denoted by the dot-and-dash line of FIG. 11.

In FIG. 12, ① visual information denotes the steering control characteristic executed in the second preferred embodiment and ② supersonic denotes the steering control characteristic when a distance in a vertical direction from, e.g., a guard rail obstacle installed along the running road to the autonomous vehicle is measured by means of a supersonic sensor or so on and the steering operation is controlled in a proportion (P), integration (I), and differential (D) control method.

As shown in FIG. 12, a smoother steering control in the case of the second preferred embodiment can be achieved as compared with the PID control of the steering operation in the case of the solid line.

In addition, since the steering operation is controlled by means of the control equation achieved on the basis of the data derived in the case when the human kind operates the steering wheel, the steering control approximate to a human's drive feeling can be realized.

FIG. 13 shows an operational flowchart indicating the above-described calculation processing executed in the second preferred embodiment.

FIGS. 14, 14 (A), and 14 (B) show explanatory top views of the autonomous vehicle for explaining the operation of the steering control system in the second preferred embodiment As shown in FIG. 14, suppose a case where an output steering angle S(n) (n denotes a present time) is determined using a data on the instance x(n) from the points of the forward direction L (meters) ahead of the autonomous vehicle.

As shown in FIG. 14 (A), an n-order equation $y = L(x)$ related to the white line information is calculated from the white line data $(x_1, t_1)_{L1}$, $(x_2, t_2)_{L2}$ at vehicular forward positions $L_1$ and $L_2$ ahead of the vehicle. It is noted that n in the output steering angle s(n) equals 3 (n=3).

Suppose that using $x = L^{-1}(y)$ (as will be described later) and using the value of $X_L^{-1}(0)$ when $y=0$ and these values are used as evaluation values of the vehicle movement. In details, in a case where the vehicle runs on positions, e.g., 2 meters aside of the white line, the relationship indicating $2.0 \approx |X_L^{-1}(0)|$ may be resulted.

The output steering angle S (n)' may be

When $2.0 > |X_L^{-1}(0)|$, $S(n)' = S(n) + \delta$

When $2.0 \leq |X_L^{-1}(0)|$, $-S(n)' = S(n) - \delta$

Wherein S (n) indicates positive in a case of a clockwise direction and S (n) indicates negative in a case of a counterclockwise direction.

In addition, when the vehicle follows up the left side white line, $\delta \geq 0$ and when the vehicle follows up the right side white line, $\delta < 0$.

Since S (n)', $x_0(n)$ ($=x(n)$), $x_{-1}(n)$, $x_{-2}(n)$,— are derived, the older data of S(0) from among the data of N+1 of S (0)~S (N) are updated.

By inputting the above-described data, the values of $\alpha$, $\beta$, $\gamma$, and $\delta$ are updated by means of the multiple regression analysis. The steering angle is calculated and output.

The coefficients in the control equation are updated during the vehicle run and after the considerable run of the vehicle, the stable running control can be achieved.

The equation of $x = L^{-1}(y)$ will be described below.

FIG. 14 (B) shows an image of vehicular forward direction photographed by the video camera 3 in which a part of the white line (on the basis of which the equation $y = L(x)$ can be established) can be viewed and another part of the white line placed aside of the vehicle (on the basis of which the equation $X_L^{-1}(0)$ can be established) cannot be viewed.

Therefore, the equation of $y = L(x)$ is established to estimate $X_L^{-1}(0)$.

Third Preferred Embodiment

FIG. 15 shows an operational flowchart executed in a fourth preferred embodiment.

As shown in FIG. 15, the present vehicle speed v (Km/h) is classified into each class according to its magnitude. The double regression coefficients $\alpha$, $\beta$, $\gamma$,— are determined for respective classified vehicle speeds $V_{CLASS}$ so that once the vehicle autonomously runs from a low speed to a high speed range, the stable steering control for every speed value can be achieved.

It is noted that the classification is such that when $0 \leq v < 10$, $V_{CLASS} = V_S$, when $10 \leq v < 20$, $V_{CLASS}(v) = V_M$, and when $20 \leq v < 30$, $V_{CLASS} = V_B$.

Since the above-described steering control equation is calculated using the white line information of the right side white line x, the last equation recited in FIG. 13 can be replaced with the following equation:

$$sr_i = \alpha_i xr_i(N-1) + \beta_i xr_i(N-1) + \gamma_i xr_i(N-2) + \delta_i$$

(N denotes a discrete time and $xr_i$ represents the right side white line information at the measuring point i).

In the case of the follow-up control to the left side white line, the last equation recited in FIG. 13 can be replaced with the following equation:

$$sl_i = \alpha_i \cdot xl_i(N-1) + \beta_i \cdot xl_i(N-1) + \gamma_i xl_i(N-2) + \delta_i$$

(wherein $xl_i$ denotes the left side white line information at the measuring point i).

It is noted that for the multiple regression analysis, refer to a Japanese document titled an analysis of multiple variables data in industries and authorized by Tadaichi Okuno and published by Nihon Kagakugizyutsu Renmei (Japan Scientific and Technological Union).

Effects Exhibited by the Present Invention

First, the effects exhibited by the first preferred embodiment will be described below.

Although the reliability is given only to the directly adjacent measuring points as shown in FIG. 6 (A), the reliabilities to the input values of the plurality of measuring points including their two or three mutually adjacent measuring points with their widths W expanded may alternatively be given. In the alternative method, the width W of each membership function Mi may be changed according to a radius of curvature of the road contour represented by the white line 22. That is to say, when the radius of curvature is small, the change in the white line position may not be so large even if the interval of distance of the mutually adjacent measuring points is considerably wide. Therefore, even if the width W is set to become wider, a result of interpolation when the white line information indicates some interruption in the white line provides no displacement deviation.

If an interval of distance between the mutually adjacent measuring points is a considerable distance, the change in position of the white line becomes large as the radius of curvature becomes large. Therefore, in this case, the width W of each membership function may become minor so that the arbitrary predetermined accuracy of determining the steering angle may be maintained.

Although, in the first preferred embodiment, the white line 22 placed along the left side edge of the road is used as the road contour index, the other white line 23 placed along a right side edge of the road may alternatively be used.

Alternatively, a road width 20 of the running road 20 obtained from both left and right white lines 22, 23 may be added into the control parameters and the control equation $sl_i$ may be set to achieve a higher accurate autonomous running.

Since the membership setting means for providing a predetermined reliability for the input value at one of the adjacent measuring point to each measuring point and, in the calculation of the steering angle related to one of the measuring points, the input values at the other measuring points are added into the calculation of the steering angle according to the degrees of reliabilities, the steering angle at one of the measuring points is calculated using the input values derived from the other measuring points adjacent to the one of the measuring points in a case where the part of white line at the one of the measuring points becomes out of view from the camera or where the part of the white line is interrupted due to the presence of the shadow or obstacle. Consequently, since no data lacks on the respective measuring points, the highly accurate autonomous run of the vehicle can be achieved even on a very complex curved road.

In addition, since the input values of the other measuring points are added into the control equation for each measuring point and they are compensated for each other, the magnitude of accuracy required in case of the multiple number of measuring points can be achieved with less number of measuring points and processing speed becomes high.

Furthermore, since the running reference line is set and the control equation calculating means calculates the steering angle on the basis of the vehicle displacement quantity derived from the road contour index position and reference line position, the vehicle 1 can accurately run on an arbitrary running road and the control equation can be simplified (thereby the processing speed can furthermore be fast).

Before explaining the effects exhibited by the second preferred embodiment, another previously proposed steering controlling system will be explained with reference to FIG. 16.

Figure 16:
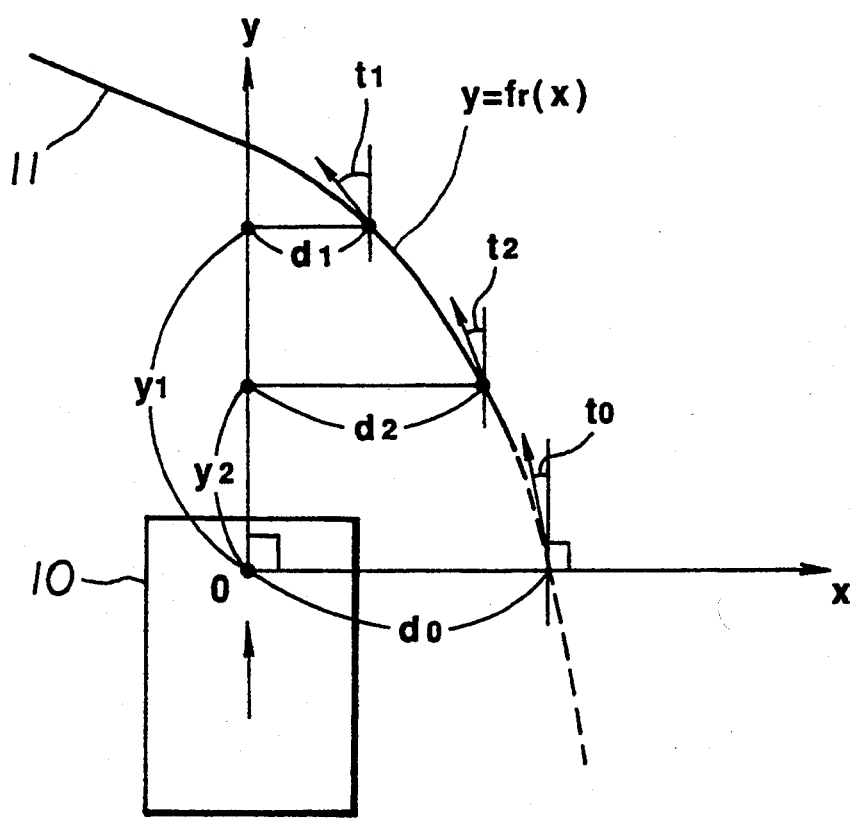
FIG. 16 is an explanatory view of a previously proposed autonomous vehicle in order to compare the operations of the second and third preferred embodiments.

In FIG. 16, numeral 10 denotes the autonomous vehicle and numeral 11 denotes the white line indicating the side end of the road.

In FIG. 16, the scene in front of the autonomous vehicle 10 is photographed by means of a photographing device such as a video camera. Using data ($d_1$, $y_1$, $t_1$), ($d_1$, $y_2$, $t_2$) on the white line 11 viewed from the front position of the camera mounted vehicle 10 from among the photograph images, the system calculates the equation $y = f_r(x)$ of the white line 11 in the x-y coordinate system with a vehicle center as an origin.

Distance data $d_0$ from the vehicle center 0 to a vertical point of the white line and tangential angle data $t_0$ are estimated on the basis of the equation of $y = f_r(x)$.

The steering control is carried out using these data. In FIG. 16, y denotes a straight distance from the vehicle origin 0 to a front predetermined point, d denotes a distance from the front predetermined point to a point of the white line in the vertical direction with respect to the vehicular straight direction, and t denotes a tangential angle at each intersection between the straight line of the vehicular forward direction and each point of white line.

It is noted that the tangential angle means an angle established between the vehicular forward direction and the line of curvature.

In the previously proposed steering control, the curved line equation of the white line is approximately estimated on the basis of the white line information of the front portion. Then, using the estimated equation, the vehicular position from the side end is calculated. However, an error may occur between the white line position and the calculated white line position. This error affects the steering control, and makes it difficult to run the vehicle in parallel to the white line of the road.

On the other hand, in the second preferred embodiment, the multiple regression analysis is used to estimate an equation in which a distance information from the photographing device such as the video camera to an index, i.e., the distance information from the point L (m) ahead of the vehicle to the index indicating the running road in the vertical direction to the vehicular forward direction (for example, one of the white lines indicating the road side end or center line) is input and the steering angle through which the vehicle is steered. Then, the present and prior information on the white line position are used.

The general structure of the steering controlling system in the second preferred embodiment is substantially the same as in the first preferred embodiment shown in FIGS. 1 and 2.

Since the feature of the second preferred embodiment is that the final steering angle is calculated using the multiple regression analysis, the method of the multiple regression analysis applied to the calculation of the final steering angle has been described above.

Since, in the second and third preferred embodiments, the related equation established for the output steering angle is estimated with the white line distance information derived through the photographing device as input parameters through the multiple regression analysis and the present and previous white line distance data are used as the white line distance information so that the multiple regression equation is estimated on the basis of the steering information and photographed information when a human operates the steering wheel of the vehicle, the steering control during the autonomous run of the vehicle achieves the smooth control of the steering mechanism having the characteristic approximate to the human drive feeling. Such a smooth steering control as described above can be achieved when the vehicle runs on any contoured road.

It will fully be appreciated by those skilled in the art that the foregoing description has been made to the preferred embodiment and various changes and modifications may be made without departing from the scope of the present invention which is to be defined by the appended claims.

What is claimed is:

1. A system for providing a steering control for an autonomous vehicle, comprising:
    a) first means, disposed on the vehicle so as to face toward a vehicular forward direction, for monitoring a presence of a road contour index extended in the vehicular forward direction;
    b) second means for setting a plurality of measuring points for a plurality of predetermined distances set toward the vehicular forward direction ahead of a vehicular center on a vehicular coordinate system;
    c) third means for defining positions of the monitored road contour index and outputting the position data of the monitored contour index defined with respect to the respective measuring points;
    d) fourth means for setting a membership function for each measuring point which gives predetermined reliabilities to input values of the position data for the measuring points mutually adjacent to the corresponding one of the measuring points to which the membership function is set; and
    e) fifth means for calculating a steering angle through which a steering mechanism of the vehicle is steered for each measuring point with the position data for the respective measuring points as input parameters, said fifth means calculating the steering angle for each measuring point, the input parameters of the other measuring points being included in the calculation of the steering angle for any one of the measuring points according to the reliabilities given to the other measuring points, said system providing the steering control for the steering mechanism of the autonomous vehicle on the basis of the calculated steering angle.

2. A system for providing a steering control for an autonomous vehicle as set forth in claim 1, which further includes sixth means for actuating the steering mechanism.

3. A system for providing a steering control for an autonomous vehicle, as set forth in claim 2, wherein said road contour index is a white line placed along a side edge of a running road and wherein said first means includes a camera for photographing the white line, and said second and third means include an Image processing block for measuring the positions of the white line to the respective measuring points.

4. A system for providing a steering control for an autonomous vehicle as set forth in claim 3, wherein said third means outputs the position data $x_i (i=1, 2, 3, —, n)$ which indicate relative position distances of the white line from the respective measuring points $l_i(i=1, 2, 3, —, n)$ on the vehicular coordinate system $L_i$ ahead of the vehicular center corresponding to a position of the actuator of the steering mechanism.

5. A system for providing a steering control for an autonomous vehicle as set forth in claim 4, wherein said fifth means sets a control equation for each measuring point expressed as $sl_i = Fl_i(x_i)$ according to each measuring point, wherein $Fl_i(x_i)$ is set as a displacement deviation function from a running reference line on which the vehicular center is moved and expressed as $Fl_i(x_i) = a_i \cdot (X_i - x_i)$, wherein $X_i$ denotes the running reference line for each measuring point and $a_i$ denotes a coefficient for each measuring point.

6. A system for providing a steering control for an autonomous vehicle as set forth in claim 4, wherein said fourth means sets the membership function denoted by $M_i$ and $M_i$ gives the reliability as $\mu l_i(j)$ $(j=1, 2, 3, —, n)$ to the input values of the position data for the respective measuring points.

7. A system for providing a steering control for an autonomous vehicle as set forth in claim 5, wherein said fifth means calculates the control equation $sl_i$ for each measuring point on the basis of a weight mean method of a fuzzy inference.

8. A system for providing a steering control for an autonomous vehicle as set forth in claim 7, wherein said fifth means calculates a final steering angle S through which the steering mechanism is steered using a gross mean of a derived control equation.

9. A system for providing a steering control for an autonomous vehicle as set forth in claim 8, wherein a membership function $M_1$ which gives a reliability of 1.0 to the input value of the position data for one measuring point $l_1$ gives the reliability of 0.5 to the second measuring point $l_2$.

10. A system for providing a steering control for an autonomous vehicle as set forth in claim 9, wherein the control equation $sl_2$ for the second measuring point is expressed as follows:

$$sl_2 = (0.5 \times Fl_2(x_1) + 1.0 \times Fl_2(x_2) + 0.5 \times Fl_2(x_2))/(0.5 + 1.0 + 0.5).$$

11. A system for providing a steering control for an autonomous vehicle as set forth in claim 10, wherein the control equation $sl_i = Fl_i(x_i)$ applies to the case when the white line corresponding to the measuring point $l_i$ and when the white line is not viewed from the camera.

12. A system for providing a steering control for an autonomous vehicle as set forth in claim 11, wherein both reliabilities to the measuring points $l_{i-1}$ and $l_{i+1}$ are 0.5 and the reliability to the measuring point $l_i$ is zero.

13. A system for providing a steering control for an autonomous vehicle as set forth in claim 4, wherein said fifth means sets a control equation $sl_i$ for each measuring point $l_i$ as follows:

$$sl_i = \alpha_i \cdot xl_i(N) + \beta_i \cdot xl_i(N-1) + \gamma_i \cdot xl_i(N-2) + \delta_i$$

wherein N, N−1, and N−2 denote discrete times, $\alpha$, $\beta$, $\gamma$, and $\delta$ denotes multiple regression coefficients estimated during the run of the vehicle, $sl_i$ denotes the control equation in a case where the steering control following up the white line placed along a left side edge of the running road as viewed from the camera is executed and $xl_i$ denotes the position data on the left side white line at the measuring points $l_i$.

14. A system for providing a steering control for an autonomous vehicle as set forth in claim 13, said fifth means calculates the instantaneous steering angle $S_0$ supposing that the distance from the white line placed along the right side edge of the running road which is vertical to the vehicular forward direction to the measuring point L meters ahead of the vehicle center $O_0$ placed at a position $V_0$ as follows:

$$S_0 = f\{x_0, x_{-1}, x_{-2}\} = \alpha \cdot x_0 + \beta \cdot x_{-1} + \gamma \cdot x_{-2} + \delta$$

wherein $x_0$, $x_{-1}$, and $x_{-2}$ denotes the position data on the white line at the present time of control, the position data thereon at a previous control period, and the position data thereon at two previous control periods
and said fifth means calculates all of the steering angles for all measuring points from a predetermined start position to a predetermined end position of a route of travel and estimates the values of $\alpha$, $\beta$, $\gamma$, and $\delta$ through a multiple regression analysis using all steering angles S.

15. A system for providing a steering control for an autonomous vehicle as set forth in claim 14, wherein said fifth means calculates the final steering angle $S_F$ as follows when the vehicle runs on a road segment having a radius of curvature of 15 meters at a vehicle speed of 10 Km/h with L being 5 meters:

$$S_F = -0.84581 \cdot x_0 - 7.13965 \cdot x_{-1} + 0.21617 \cdot x_2 + 15.4842.$$

16. A system for providing a steering control for an autonomous vehicle as set forth in claim 4, wherein said fifth means sets a control equation $sr_i$ for each measuring point $l_i$ as follows:

$$sr_i = \alpha_i \cdot xr_i(N) + \beta_i \cdot xr_i(N-1) + \gamma_i \cdot xr_i(N-2) + \delta_i$$

wherein N, N−1, and N−2 denote discrete times, $\alpha$, $\beta$, $\gamma$, and $\delta$ denotes multiple regression coefficients estimated during the run of the vehicle, $sr_i$ denotes the control equation in a case where the steering control following up the white line placed along a right side edge of the running road as viewed from the camera is executed, and $xr_i$ denotes the position data of the right side white line at the measuring points $l_i$.

17. A system for providing a steering control for an autonomous vehicle as set forth in claim 16, wherein said fifth means sets another control equation $sl_i$ for each measuring point $l_i$ as follows:

$$sl_i = \alpha_i \cdot xl_i(N) + \beta_i \cdot xl_i(N-1) + \gamma_i \cdot xl\,i(N-2) + \delta,$$

wherein N, N−1, and N−2 denote discrete times, $\alpha$, $\beta$, $\gamma$, and $\delta$ denotes multiple regression coefficients estimated during the run of the vehicle, $sl_i$ denotes the control equation in a case where the steering control following up the white line placed along a left side edge of the running road as viewed from the camera is executed and $xl_i$ denotes the position data on the left side white line at the measuring points $l_i$, and wherein said fifth means sets still another control equation $s_i$ for each measuring point $1_i$
wherein the control equation $s_i$ is set according to the equation:
$s_i = (sl_i + sr_i)/2$, wherein $s_i$ denotes the control equation in a case where the steering control following up both white lines placed along both side edges of the running road.

18. A system for providing a steering control for an autonomous vehicle as set forth in claim 17, wherein said fifth means determines and outputs the final steering angle S(n) using the white line distance data x(n) L meters ahead of the vehicular center as follows:
calculating an n-order equation related to the left side white line y = L (x) from the white line distance data $(x_1, t_1)L_1$, $(x_2, t_2)L_2$ at the front positions denoted by $L_1$ and $L_2$ ahead of the vehicular center;
calculating the output steering angle S(n)' as follows using an equation of $x = L^{-1}(y)$ and $X_L^{-1}(0)$ as evaluation values of vehicle movement:
S(n)' = S(n) + $\delta$ when a value of the distance of the vehicle to the white line $> |X_L^{-1}|$ and
−S(n)' = S(n) − $\delta$ when a value of the distance of the vehicle to the white line $\leq |X_L^{-1}|$
updating old S(0) from among N+1 data of S(0)~S(N) after deriving S(n)', $x_0(n)$, $x_{-1}(n)$, $x_{-2}(n)$, —
updating the values of $\alpha$, $\beta$, $\gamma$, and $\delta$ through the multiple regression analysis
and calculating the final steering angle S(N) on the basis of the derived steering angle S(n)'.

19. A system for providing a steering control for an autonomous vehicle as set forth in claim 18, wherein the value of $X_L^{-1}(0)$ is estimated from the equation of y = L(x) when y = 0.

20. A system for providing a steering control for an autonomous vehicle as set forth in claim 17, which further includes calculating means for deriving an instantaneous vehicle speed and the multiple regression coefficients $\alpha$, $\beta$, $\gamma$, and $\delta$ are determined for each classified vehicle speed $V_{CLASS}$ which is classified according to a magnitude of the vehicle speed.

21. A system for providing a steering control for an autonomous vehicle so as to run the vehicle in parallel to a road contour index, comprising:
a) first means having a video camera, the video camera being disposed on the vehicle so as to face toward a vehicle forward direction, for photographing a white line serving as the road contour index extending along a side edge of a running road and outputting an image signal indicating a presence of the white line;
b) second means, including an image processing block, for setting a plurality of measuring points for a plurality of predetermined distances set toward the vehicular forward direction ahead of a vehicular center on a vehicular coordinate system and for defining positions of the white line with respect to the respective measuring points and outputting the position data of the white line at the respective measuring points and outputting the defined position data;

c) third means for setting a running reference line on which the vehicle is to run autonomously;

d) fourth means for setting a membership function for each measuring point which at least gives predetermined reliabilities to input values of the position data for the measuring points mutually adjacent to the corresponding one of the measuring points to which the membership function is set; and e) fifth means for calculating a steering angle through which a steering mechanism of the vehicle is steered for each measuring point with the position data for the respective measuring points and output from the third means as input steering values, said fifth means calculating the steering angle for each measuring point on a basis of a weight mean method in which reliabilities are multiplied by the position data for the respective measuring points and outputting a final steering angle which is calculated using a gross mean of the calculated steering angle and said system providing the steering control through the steering mechanism of the vehicle on the basis of the calculated final output steering angle of the fifth means so as to run the vehicle in parallel to the road contour index.

22. A system for providing a steering control for an autonomous vehicle so as to run the vehicle in parallel to a road contour index as set forth in claim 21, which further includes a steering drive block having an actuator of said steering mechanism and which actuates the actuator to steer the vehicle through the final steering angle calculated by the fifth means.

23. A system for providing a steering control for an autonomous vehicle so as to run the vehicle in parallel to a road contour index as set forth in claim 22, wherein said second means outputs the position data, which said position data indicates relative distances of the white line from respective measuring points.

24. A system for providing a steering control for an autonomous vehicle so as to run the vehicle in parallel to a road contour index as set forth in claim 23, wherein said fifth means sets a control equation for each measuring point expressed as $sl_i = Fl_i(x_i)$ according to each measuring point, wherein $Fl_i(x_i)$ is set as a displacement deviation function from the running reference line on which the vehicular center is moved and expressed as $Fl_i(x_i) = \alpha_i \cdot (X_i - x_i)$, wherein $X_i$ denotes the running reference line for each measuring point and $\alpha_i$ denotes a predetermined coefficient for each measuring point.

25. A system for providing a steering control for an autonomous vehicle so as to run the vehicle in parallel to a road contour index as set forth in claim 24, wherein said fourth means sets the membership function denoted by $M_i$ and $M_i$ gives the reliability as $\mu l_i(j)$ ($j = 1, 2, 3, \text{—}, n$) to the input values of the position data for the respective measuring points.

26. A system for providing a steering control for an autonomous vehicle so as to run the vehicle in parallel to a road contour index as set forth in claim 25, wherein said fifth means calculates the control equation $sl_i$ for each measuring point on the basis of the weight mean method on a fuzzy inference.

27. A system for providing a steering control for an autonomous vehicle so as to run the vehicle in parallel to a road contour index as set forth in claim 26, wherein said fifth means calculates the control equation for each measuring point.

28. A system for providing a steering control for an autonomous vehicle so as to run the vehicle in parallel to a road contour index as set forth in claim 27, wherein said fifth means calculates the final steering angle S through which the steering mechanism is steered using a weighted mean method.

29. A method for providing a steering control for an autonomous vehicle so as to run the vehicle in parallel to a road contour index, comprising the steps of:

a) monitoring a presence of a road contour index extending in the vehicular forward direction;

b) setting a plurality of measuring points for a plurality of predetermined distances set toward the vehicular forward direction ahead of a vehicular center on a vehicular coordinate system;

c) defining positions of the monitored road contour index with respect to the respective measuring points and outputting the position data of the monitored contour index defined with respect to the respective measuring points;

d) setting a membership function for each measuring point which gives predetermined reliabilities to input values of the position data for the measuring points mutually adjacent to the corresponding one of the measuring points to which the membership function is set;

e) calculating a steering angle through which a steering mechanism of the vehicle is steered for each measuring point with the position data for the respective measuring points as input steering values; and (f) calculating the steering angle for each measuring point, the input values of the other measuring points being included in the calculation of the steering angle for any one of the measuring points according to reliabilities given to the other measuring points, said method providing the steering control for the steering mechanism of the autonomous vehicle on the basis of the calculated steering angle.

* * * * *